United States Patent
Lee et al.

(10) Patent No.: US 11,973,209 B2
(45) Date of Patent: Apr. 30, 2024

(54) POSITIVE ELECTRODE ACTIVE MATERIAL INCLUDING SINGLE PARTICLES OF LITHIUM NICKEL COMPOSITE TRANSITION METAL OXIDE, METHOD OF PREPARING THE SAME, AND LITHIUM SECONDARY BATTERY INCLUDING THE SAME

(71) Applicant: LG Chem, Ltd., Seoul (KR)

(72) Inventors: Eun Hee Lee, Daejeon (KR); Seong Bae Kim, Daejeon (KR); Young Su Park, Daejeon (KR); Yi Rang Lim, Daejeon (KR); Hong Kyu Park, Daejeon (KR); Song Yi Yang, Daejeon (KR); Byung Hyun Hwang, Daejeon (KR); Woo Hyun Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 882 days.

(21) Appl. No.: 16/968,737

(22) PCT Filed: Jun. 7, 2019

(86) PCT No.: PCT/KR2019/006893
§ 371 (c)(1),
(2) Date: Aug. 10, 2020

(87) PCT Pub. No.: WO2019/235885
PCT Pub. Date: Dec. 12, 2019

(65) Prior Publication Data
US 2021/0005875 A1 Jan. 7, 2021

(30) Foreign Application Priority Data
Jun. 7, 2018 (KR) .......................... 10-2018-0065527

(51) Int. Cl.
*H01M 4/131* (2010.01)
*H01M 4/02* (2006.01)
(Continued)

(52) U.S. Cl.
CPC ......... *H01M 4/131* (2013.01); *H01M 4/0471* (2013.01); *H01M 4/134* (2013.01);
(Continued)

(58) Field of Classification Search
CPC .... H01M 4/131; H01M 4/0471; H01M 4/134; H01M 4/1391; H01M 4/1395;
(Continued)

(56) References Cited

U.S. PATENT DOCUMENTS

2006/0068290 A1 3/2006 Sawa et al.
2010/0136430 A1* 6/2010 Lee ...................... H01M 4/131
252/503

(Continued)

FOREIGN PATENT DOCUMENTS

CN 101621125 A 1/2010
CN 106450155 A * 2/2017 ............. C01G 53/50
(Continued)

OTHER PUBLICATIONS

Extended European Search Report including Written Opinion for Application No. 19814909.8 dated May 12, 2021, 7 pages.
(Continued)

*Primary Examiner* — Sean P Cullen
(74) *Attorney, Agent, or Firm* — Lerner David LLP

(57) ABSTRACT

A positive electrode active material for a secondary battery includes a lithium composite transition metal oxide including nickel (Ni), cobalt (Co), and manganese (Mn), wherein the lithium composite transition metal oxide has a layered crystal structure of space group R3m, includes the nickel (Ni) in an amount of 60 mol % or less based on a total
(Continued)

amount of transition metals, includes the cobalt (Co) in an amount greater than an amount of the manganese (Mn), and is composed of single particles.

19 Claims, 7 Drawing Sheets

(51) Int. Cl.
  *H01M 4/04*    (2006.01)
  *H01M 4/134*    (2010.01)
  *H01M 4/1391*   (2010.01)
  *H01M 4/1395*   (2010.01)
  *H01M 4/36*    (2006.01)
  *H01M 4/505*    (2010.01)
  *H01M 4/525*    (2010.01)
  *H01M 10/0525*   (2010.01)

(52) U.S. Cl.
  CPC ........ *H01M 4/1391* (2013.01); *H01M 4/1395* (2013.01); *H01M 4/364* (2013.01); *H01M 4/366* (2013.01); *H01M 4/505* (2013.01); *H01M 4/525* (2013.01); *H01M 10/0525* (2013.01); *H01M 2004/021* (2013.01); *H01M 2004/028* (2013.01)

(58) Field of Classification Search
  CPC ...... H01M 4/364; H01M 4/366; H01M 4/505; H01M 4/525
  USPC ..................................................... 429/231.95
  See application file for complete search history.

(56) References Cited

U.S. PATENT DOCUMENTS

| | | | |
|---|---|---|---|
| 2011/0031437 | A1 | 2/2011 | Nagase et al. |
| 2011/0226986 | A1 | 9/2011 | Wang et al. |
| 2011/0291044 | A1 | 12/2011 | Wang et al. |
| 2014/0106228 | A1 | 4/2014 | Toya et al. |
| 2014/0205898 | A1 | 7/2014 | Lee et al. |
| 2015/0010819 | A1 | 1/2015 | Lee et al. |
| 2015/0162598 | A1 | 6/2015 | Kim et al. |
| 2015/0228973 | A1 | 8/2015 | Won et al. |
| 2015/0249248 | A1* | 9/2015 | Ishizaki ............ H01M 10/0525 429/223 |
| 2016/0254536 | A1* | 9/2016 | Hiratsuka ............ H01M 4/366 429/223 |
| 2017/0125808 | A1* | 5/2017 | Blangero ............... C01G 53/42 |
| 2017/0288223 | A1 | 10/2017 | Ogawa et al. |
| 2018/0083262 | A1* | 3/2018 | Zhou .................... H01M 4/131 |
| 2018/0145322 | A1* | 5/2018 | Choi .................... H01M 4/505 |
| 2018/0175368 | A1* | 6/2018 | Zhou .................... H01M 4/131 |
| 2018/0233740 | A1 | 8/2018 | You et al. |
| 2018/0241040 | A1 | 8/2018 | You et al. |
| 2019/0020026 | A1 | 1/2019 | Choi et al. |
| 2019/0027782 | A1 | 1/2019 | Tamura et al. |
| 2019/0058191 | A1* | 2/2019 | Mitsumoto ........... H01M 4/505 |

FOREIGN PATENT DOCUMENTS

| | | | | |
|---|---|---|---|---|
| CN | 106532005 | A * | 3/2017 | ............ C01G 53/50 |
| JP | 2004192846 | A | 7/2004 | |
| JP | 2004355824 | A | 12/2004 | |
| JP | 2004355986 | A | 12/2004 | |
| JP | 2006054159 | A | 2/2006 | |
| JP | 2006120612 | A | 5/2006 | |
| JP | 2007179917 | A | 7/2007 | |
| JP | 2012252844 | A | 12/2012 | |
| JP | 2016024879 | A * | 2/2016 | ........ H01M 10/0525 |
| JP | 2016139569 | A | 8/2016 | |
| JP | 2017014092 | A * | 1/2017 | ............ C01G 53/00 |
| JP | 2017188445 | A | 10/2017 | |
| KR | 20100133421 | A | 12/2010 | |
| KR | 20110086817 | A | 8/2011 | |
| KR | 20110128862 | A | 11/2011 | |
| KR | 20140018685 | A | 2/2014 | |
| KR | 20140084566 | A | 7/2014 | |
| KR | 20140093529 | A | 7/2014 | |
| KR | 20150006283 | A | 1/2015 | |
| KR | 20150093539 | A | 8/2015 | |
| KR | 20170045833 | A | 4/2017 | |
| KR | 20170046921 | A | 5/2017 | |
| KR | 20170081950 | A | 7/2017 | |
| WO | 2017135414 | A1 | 8/2017 | |
| WO | WO-2017146248 | A1 * | 8/2017 | ............ C01G 53/50 |

OTHER PUBLICATIONS

International Search Report for Application No. PCT/KR2019/006893 dated Sep. 19, 2019, 2 pages.

* cited by examiner

POSITIVE ELECTRODE ACTIVE MATERIAL INCLUDING SINGLE PARTICLES OF LITHIUM NICKEL COMPOSITE TRANSITION METAL OXIDE, METHOD OF PREPARING THE SAME, AND LITHIUM SECONDARY BATTERY INCLUDING THE SAME

CROSS-REFERENCE TO RELATED APPLICATIONS

This application is a national phase entry under 35 U.S.C. § 371 of International Application No. PCT/KR2019/006893, filed Jun. 7, 2019, which claims priority to Korean Patent Application No. 10-2018-0065527, filed Jun. 7, 2018, the disclosures of which are incorporated herein by reference.

TECHNICAL FIELD

The present invention relates to a positive electrode active material for a secondary battery, a method of preparing the same, and a lithium secondary battery including the positive electrode active material.

BACKGROUND ART

Recently, with the rapid spread of electronic devices using batteries, such as mobile phones, notebook computers, and electric vehicles, demand for secondary batteries with relatively high capacity as well as small size and lightweight has been rapidly increased. Particularly, since a lithium secondary battery is lightweight and has high energy density, the lithium secondary battery is in the spotlight as a driving power source for portable devices. Accordingly, research and development efforts for improving the performance of the lithium secondary battery have been actively conducted.

In the lithium secondary battery in a state in which an organic electrolyte solution or a polymer electrolyte solution is filled between a positive electrode and a negative electrode which are respectively formed of active materials capable of intercalating and deintercalating lithium ions, electrical energy is produced by oxidation and reduction reactions when the lithium ions are intercalated/deintercalated into/from the positive electrode and the negative electrode.

Lithium cobalt oxide ($LiCoO_2$), lithium nickel oxide ($LiNiO_2$), lithium manganese oxide ($LiMnO_2$ or $LiMn_2O_4$, etc.), or a lithium iron phosphate compound ($LiFePO_4$) has been used as a positive electrode active material of the lithium secondary battery. Among these materials, since the lithium cobalt oxide ($LiCoO_2$) is advantageous in that its operating voltage is high and capacity characteristics are excellent, the lithium cobalt oxide ($LiCoO_2$) has been widely used and has been used as a positive electrode active material for high voltage. However, since there is a limitation in using a large amount of the $LiCoO_2$ as a power source for applications, such as electric vehicles, due to the rising price and unstable supply of cobalt (Co), there emerges a need to develop a positive electrode active material capable of replacing the $LiCoO_2$.

Accordingly, a nickel cobalt manganese-based lithium composite transition metal oxide (hereinafter, simply referred to as 'NCM-based lithium composite transition metal oxide'), in which a portion of cobalt (Co) is substituted with nickel (Ni) and manganese (Mn), has been developed. However, since a conventionally developed NCM-based lithium composite transition metal oxide is generally in the form of a secondary particle in which primary particles are aggregated, its specific surface area is large, particle strength is low, and an amount of lithium by-product is large, and thus, there is a limitation in that an amount of gas generated during cell operation is large and stability is poor. That is, since the stability of the conventionally developed NCM-based lithium composite transition metal oxide has not been secured, there was a limitation in its application to a high-voltage battery, and thus, there is still a need to develop an NCM-based lithium composite transition metal oxide positive electrode active material applicable to a high-voltage lithium secondary battery.

DISCLOSURE OF THE INVENTION

Technical Problem

An aspect of the present invention provides an NCM-based lithium composite transition metal oxide positive electrode active material applicable to a high-voltage lithium secondary battery. Specifically, the present invention aims at providing an NCM-based lithium composite transition metal oxide positive electrode active material in which an amount of gas generated during cell operation may be reduced by decreasing a specific surface area, improving particle strength, and decreasing an amount of lithium by-product.

Technical Solution

According to an aspect of the present invention, there is provided a positive electrode active material for a secondary battery which includes a lithium composite transition metal oxide including nickel (Ni), cobalt (Co), and manganese (Mn), wherein the lithium composite transition metal oxide has a layered crystal structure of space group R3m, includes the nickel (Ni) in an amount of 60 mol % or less based on a total amount of transition metals, includes the cobalt (Co) in an amount greater than an amount of the manganese (Mn), and is composed of a single particle.

According to another aspect of the present invention, there is provided a method of preparing a positive electrode active material for a secondary battery which includes: preparing a precursor including nickel (Ni), cobalt (Co), and manganese (Mn) in which an amount of the nickel (Ni) in a total amount of transition metals is 60 mol % or less and the cobalt (Co) is included in an amount greater than an amount of the manganese (Mn); and mixing the precursor with a lithium raw material and sintering the mixture at a temperature of 980° C. or more to form a lithium composite transition metal oxide having a layered crystal structure of space group R3m and composed of a single particle.

According to another aspect of the present invention, there is provided a positive electrode and a lithium secondary battery which include the positive electrode active material.

Advantageous Effects

According to the present invention, an amount of gas generated during cell operation may be reduced by decreasing a specific surface area of an NCM-based positive electrode active material, improving particle strength, and decreasing an amount of lithium by-product. Since the NCM-based positive electrode active material of the present invention may ensure excellent stability, it is applicable to a high-voltage lithium secondary battery.

Also, according to the present invention, a single particle of an NCM-based positive electrode active material may be easily prepared by only single sintering.

MODE FOR CARRYING OUT THE INVENTION

Figure 1:
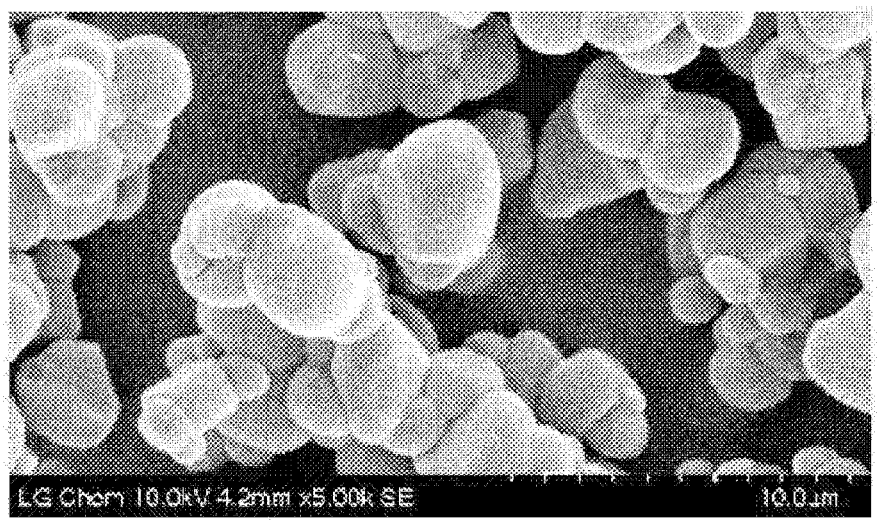
FIGS. 1 through 5 are magnified scanning electron microscope (SEM) images of positive electrode active materials prepared in Examples 1, 3, and 4 and Comparative Examples 1 and 2.

Hereinafter, the present invention will be described in more detail to allow for a clearer understanding of the present invention. In this case, it will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

<Positive Electrode Active Material>

A positive electrode active material for a secondary battery of the present invention is a lithium composite transition metal oxide including nickel (Ni), cobalt (Co), and manganese (Mn), wherein the lithium composite transition metal oxide has a layered crystal structure of space group R3m, includes the nickel (Ni) in an amount of 60 mol % or less based on a total amount of transition metals, includes the cobalt (Co) in an amount greater than an amount of the manganese (Mn), and is composed of a single particle.

The lithium composite transition metal oxide according to an embodiment of the present invention may include nickel (Ni), cobalt (Co), and manganese (Mn) in which an amount of the nickel (Ni) may satisfy 60 mol % or less, preferably 55 mol % or less, and more preferably 50 mol % or less. Also, the lithium composite transition metal oxide may include the cobalt (Co) in an amount greater than an amount of the manganese (Mn), and, for example, a concentration of the cobalt (Co) may be greater than that of the manganese (Mn) by 5 mol % or more and may more preferably be greater than that of the manganese (Mn) by 10 mol % or more. A single particle of an NCM-based positive electrode active material having a layered crystal structure of space group R3m may be easily formed by only single sintering the lithium composite transition metal oxide satisfying the above composition at a temperature of 980° C. or more.

As described above, with respect to the NCM-based positive electrode active material of the present invention which is a single particle and has a layered crystal structure of space group R3m, an amount of gas generated during cell operation may be reduced by decreasing a specific surface area, improving particle strength, and decreasing an amount of lithium by-product. Also, since the NCM-based positive electrode active material of the present invention may ensure excellent stability, it is applicable to a high-voltage lithium secondary battery.

The positive electrode active material of the present invention is composed of a single particle, which is not in the form of an aggregated secondary particle, that is, a primary particle. In the present invention, the expression 'primary particle' denotes a primary structure of the single particle, and the expression 'secondary particle' denotes an aggregate in which primary particles are aggregated by physical or chemical bonding between the primary particles without an intentional aggregation or assembly process of the primary particles constituting the secondary particle, that is, a secondary structure.

The primary particle may have an average particle diameter ($D_{50}$) of 2 μm to 10 μm. The primary particle may more preferably have an average particle diameter ($D_{50}$) of 3 μm to 9 μm and may most preferably have an average particle diameter ($D_{50}$) of 4 μm to 8 μm. With respect to the positive electrode active material composed of a single particle having the average particle diameter ($D_{50}$) of the primary particle, particle strength may be increased to suppress particle breakage during rolling and improve rolling density, and the amount of gas generated by a side reaction with an electrolyte solution may be reduced due to decreases in specific surface area and lithium by-product.

In the present invention, the average particle diameter ($D_{50}$) may be defined as a particle diameter at a cumulative volume of 50% in a particle size distribution curve. The average particle diameter ($D_{50}$), for example, may be measured by using a laser diffraction method. For example, in a method of measuring the average particle diameter ($D_{50}$) of the positive electrode active material, after the particles of the positive electrode active material are dispersed in a dispersion medium, the dispersion medium is introduced into a commercial laser diffraction particle size measurement instrument (e.g., Microtrac MT 3000) and irradiated with ultrasonic waves having a frequency of about kHz and an output of 40 W, and the average particle diameter ($D_{50}$) at the cumulative volume of 50% may then be calculated by the measurement instrument.

Since the positive electrode active material is over-sintered, the positive electrode active material may have a crystallite size of 210 nm or more, may preferably have a crystallite size of 213 nm or more, and may more preferably have a crystallite size of 215 nm or more. The positive electrode active material satisfying the above crystallite size according to an embodiment of the present invention may suppress the particle breakage caused by rolling, and life characteristics and stability may be improved.

In the present invention, the expression 'particle' denotes a granule with a size of microns, and, when the particle is magnified and observed, the particle may be identified as 'grain' which has a crystal form with a size of a few tens of nanometers. When the grain is further magnified, it is possible to identify a separated region having a form in which atoms form a lattice structure in a predetermined direction, wherein the region is referred to as a 'crystallite', and a size of the particle observed by X-ray diffraction (XRD) is defined as a size of the crystallite. With respect to a method of measuring the crystallite size, the crystallite size may be determined by peak broadening of XRD data and may be quantitatively calculated from the Scherrer equation.

The positive electrode active material of the present invention has a layered crystal structure of space group R3m, and a peak corresponding to a layered rock-salt structure may not appear during XRD measurement. Specifically, a peak corresponding to a layered rock-salt structure may not appear in a 2Θ range of 20° to 25° during XRD measurement of the positive electrode active material according to the embodiment of the present invention.

The lithium composite transition metal oxide according to the embodiment of the present invention may have a molar ratio (Li/M) of lithium (Li) to total metallic elements (M) of 1.06 or less, preferably 1 to 1.05, and more preferably 1 to 1.04.

The positive electrode active material of the present invention may have a particle size index (PSI) represented by the following Equation 1 of 60 or more, preferably 63 or more, and more preferably 75 or more.

$$\text{PSI(Particle Size Index)} = D_{50,\ 1.5\ ton}(\mu m) \times D_{50,\ 3.0\ ton}(\mu m) \times \text{rolling density}_{3.0\ ton}(g/cc) \quad \text{[Equation 1]}$$

In Equation 1, $D_{50,\ 1.5\ ton}$ is an average particle diameter ($D_{50}$) of the positive electrode active material after pressurization at 1.5 tons, $D_{50,\ 3.0\ ton}$ is an average particle diameter ($D_{50}$) of the positive electrode active material after pressurization at 3.0 tons, and rolling density$_{3.0\ ton}$ is rolling density during pressurization at 3.0 tons.

Specifically, the $D_{50,\ 1.5\ ton}$, $D_{50,\ 3.0\ ton}$, and rolling density$_{3.0\ ton}$ are values measured by experimental methods described in Experimental Example 5 below.

The PSI of the single particle of the positive electrode active material according to the embodiment of the present invention may satisfy 60 or more, and the positive electrode active material having a PSI of 60 or more may suppress the particle breakage during rolling, may improve the rolling density, and may reduce the amount of gas generated due to the side reaction with the electrolyte solution by decreasing the specific surface area and the amount of lithium by-product.

The positive electrode active material according to the embodiment of the present invention may have a specific surface area of 0.50 m²/g or less, preferably 0.20 m²/g to 0.50 m²/g, and more preferably 0.25 m²/g to 0.45 m²/g.

The positive electrode active material according to the embodiment of the present invention may include a residual lithium by-product in an amount of 0.20 wt % or less, preferably 0.18 wt % or less, and more preferably 0.15 wt % or less based on a total weight of the positive electrode active material.

Since the above specific surface area and/or amount of the lithium by-product are satisfied, the amount of gas generated during cell operation may be reduced and the positive electrode active material is applicable to a high-voltage lithium secondary battery because excellent stability is ensured even at a high voltage.

Also, the positive electrode active material according to the embodiment of the present invention may have a rolling density during pressurization at 2.5 tons of 2.90 g/cc or more, preferably 2.93 g/cc or more, and more preferably 2.95 g/cc or more. With respect to the single particle of the positive electrode active material according to the embodiment of the present invention, since the particle strength is improved, the particle breakage during rolling may be suppressed, and, accordingly, the rolling density may be increased. Since the above rolling density is satisfied, energy density may be improved.

Specifically, the lithium composite transition metal oxide according to the embodiment of the present invention may be represented by Formula 1 below.

$$Li_pNi_{1-(x1+y1+z1)}Co_{x1}Mn_{y1}M^a{}_{z1}O_{2+\delta} \quad \text{[Formula 1]}$$

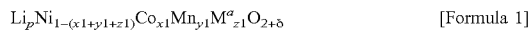

In Formula 1, $M^a$ is at least one element selected from the group consisting of aluminum (Al), zirconium (Zr), titanium (Ti), magnesium (Mg), tantalum (Ta), niobium (Nb), molybdenum (Mo), chromium (Cr), barium (Ba), strontium (Sr), and calcium (Ca), and $0.9 \le p \le 1.06$, $0 < x1 \le 0.5$, $0 < y1 \le 0.5$, $0 \le z1 \le 0.1$, $-0.1 \le \delta \le 1$, $x1 > y1$, and $0.4 \le x1+y1+z1 < 1$.

In the lithium composite transition metal oxide of Formula 1, Li may be included in an amount corresponding to p, that is, $0.9 \le p \le 1.06$. When p is less than 0.9, capacity may be reduced, and, when p is greater than 1.06, milling is difficult due to an increase in strength of the sintered positive electrode active material and there may be an increase in amount of gas generated due to an increase in Li by-product. The Li may more preferably be included in an amount satisfying $1.0 \le p \le 1.06$, in consideration of balance between a capacity characteristics improvement effect of the positive electrode active material and sinterability during the preparation of the active material due to the control of the amount of the Li.

In the lithium composite transition metal oxide of Formula 1, Ni may be included in an amount corresponding to $1-(x1+y1+z1)$, for example, $0 < 1-(x1+y1+z1) \le 0.6$. The Ni may more preferably be included in an amount satisfying $0.4 < 1-(x1+y1+z1) \le 0.6$.

In the lithium composite transition metal oxide of Formula 1, Co may be included in an amount corresponding to x1, that is, $0 < x1 \le 0.5$. In a case in which the amount of the Co in the lithium composite transition metal oxide of Formula 1 is greater than 0.5, there is a concern that cost may increase. The Co may specifically be included in an amount satisfying $0.2 \le x1 \le 0.4$ in consideration of a significant capacity characteristics improvement effect due to the inclusion of the Co.

In the lithium composite transition metal oxide of Formula 1, Mn may be included in an amount corresponding to y1, that is, $0 < y1 \le 0.5$. Mn may improve stability of the positive electrode active material, and, as a result, may improve stability of the battery. The Mn may specifically be included in an amount satisfying $0.05 \le y1 \le 0.2$.

In the lithium composite transition metal oxide of Formula 1, the Co may be included in an amount greater than the amount of the Mn, that is, $x1 > y1$. A single particle of an NCM-based positive electrode active material having a layered crystal structure of space group R3m may be easily formed by only single sintering the lithium composite transition metal oxide satisfying the above composition at a temperature of 980° C. or more.

In the lithium composite transition metal oxide of Formula 1, $M^a$ may be a doping element included in a crystal structure of the lithium composite transition metal oxide, wherein the $M^a$ may be included in an amount corresponding to z1, that is, $0 \le z1 \le 0.1$.

Furthermore, with respect to the positive electrode active material according to the embodiment of the present invention, a coating portion including at least one selected from the group consisting of Al, boron (B), Zr, Ti, Mg, Ta, Nb, Mo, tungsten (W), and Cr may be formed on the surface of the particle including the lithium composite transition metal oxide. The coating portion may preferably include Al, B, and/or W, and may more preferably include Al. Since the coating portion is further formed, the lithium by-product on the surface of the particle may be further reduced and the amount of the gas generated during cell operation may be further reduced.

<Method of Preparing Positive Electrode Active Material>

Next, a method of preparing the positive electrode active material of the present invention will be described.

The positive electrode active material of the present invention is prepared by including the steps of: preparing a precursor including nickel (Ni), cobalt (Co), and manganese (Mn) in which an amount of the nickel (Ni) in a total amount of transition metals is 60 mol % or less and the cobalt (Co) is included in an amount greater than an amount of the manganese (Mn); and mixing the precursor with a lithium raw material and sintering the mixture at a temperature of 980° C. or more to form a lithium composite transition metal oxide having a layered crystal structure of space group R3m and composed of a single particle.

The method of preparing the positive electrode active material will be described in detail for each step.

First, a precursor including nickel (Ni), cobalt (Co), and manganese (Mn), in which an amount of the nickel (Ni) in a total amount of transition metals is 60 mol % or less and the cobalt (Co) is included in an amount greater than an amount of the manganese (Mn), is prepared.

The positive electrode active material precursor may be used by purchasing a commercially available positive electrode active material precursor, or may be prepared according to a method of preparing a positive electrode active material precursor which is well known in the art.

For example, the precursor may be prepared by a co-precipitation reaction by adding an ammonium cation-containing complexing agent and a basic compound to a transition metal solution including a nickel-containing raw material, a cobalt-containing raw material, and a manganese-containing raw material.

The nickel-containing raw material, for example, may include nickel-containing acetic acid salts, nitrates, sulfates, halides, sulfides, hydroxides, oxides, or oxyhydroxides, and may specifically include $Ni(OH)_2$, NiO, NiOOH, $NiCO_3 \cdot 2Ni(OH)_2 \cdot 4H_2O$, $NiC_2O_2 \cdot 2H_2O$, $Ni(NO_3)_2 \cdot 6H_2O$, $NiSO_4$, $NiSO_4 \cdot 6H_2O$, a fatty acid nickel salt, a nickel halide, or a combination thereof, but the present invention is not limited thereto.

The cobalt-containing raw material may include cobalt-containing acetic acid salts, nitrates, sulfates, halides, sulfides, hydroxides, oxides, or oxyhydroxides, and may specifically include $Co(OH)_2$, CoOOH, $Co(OCOCH_3)_2 \cdot 4H_2O$, $Co(NO_3)_2 \cdot 6H_2O$, $Co(SO_4)_2$, $Co(SO_4)_2 \cdot 7H_2O$, or a combination thereof, but the present invention is not limited thereto.

The manganese-containing raw material, for example, may include manganese-containing acetic acid salts, nitrates, sulfates, halides, sulfides, hydroxides, oxides, oxyhydroxides, or a combination thereof, and may specifically include a manganese oxide such as $Mn_2O_3$, $MnO_2$, and $Mn_3O_4$; a manganese salt such as $MnCO_3$, $Mn(NO_3)_2$, $MnSO_4$, manganese acetate, manganese dicarboxylate, manganese citrate, and a fatty acid manganese salt; a manganese oxyhydroxide, manganese chloride, or a combination thereof, but the present invention is not limited thereto.

The transition metal solution may be prepared by adding the nickel-containing raw material, the cobalt-containing raw material, and the manganese-containing raw material to a solvent, specifically water, or a mixture of water and an organic solvent (e.g., alcohol etc.) which may be uniformly mixed with the water, or may be prepared by mixing an aqueous solution of the nickel-containing raw material, an aqueous solution of the cobalt-containing raw material, and the manganese-containing raw material.

The ammonium cation-containing complexing agent, for example, may include $NH_4OH$, $(NH_4)_2SO_4$, $NH_4NO_3$, $NH_4Cl$, $CH_3COONH_4$, $NH_4CO_3$, or a combination thereof, but the present invention is not limited thereto. The ammonium cation-containing complexing agent may be used in the form of an aqueous solution, and, in this case, water or a mixture of water and an organic solvent (specifically, alcohol etc.), which may be uniformly mixed with the water, may be used as a solvent.

The basic compound may include a hydroxide of alkali metal or alkaline earth metal, such as NaOH, KOH, or $Ca(OH)_2$, a hydrate thereof, or a combination thereof. The basic compound may also be used in the form of an aqueous solution, and, in this case, water or a mixture of water and an organic solvent (specifically, alcohol etc.), which may be uniformly mixed with the water, may be used as a solvent.

The basic compound is added to adjust a pH of a reaction solution, wherein the basic compound may be added in an amount such that the pH of the metal solution is 11 to 13.

The co-precipitation reaction may be performed in a temperature range of 40° C. to 70° C. in an inert atmosphere such as nitrogen or argon.

Particles of a nickel-cobalt-manganese hydroxide are formed by the above-described process, and are precipitated in the reaction solution. Concentrations of the nickel-containing raw material, the cobalt-containing raw material, and the manganese-containing raw material may be adjusted to prepare a precursor in which the amount of the nickel (Ni) in the total amount of the transition metals is 60 mol % or less and the cobalt (Co) is included in an amount greater than the amount of the manganese (Mn). The precipitated nickel-cobalt-manganese hydroxide particles may be separated according to a conventional method and dried to prepare a nickel-cobalt-manganese precursor.

Next, the precursor is mixed with a lithium raw material and the mixture is sintered at a temperature of 980° C. or more to form a lithium composite transition metal oxide having a layered crystal structure of space group R3m and composed of a single particle.

As the lithium raw material, lithium-containing sulfates, nitrates, acetic acid salts, carbonates, oxalates, citrates, halides, hydroxides, or oxyhydroxides may be used, and these materials are not particularly limited as long as they may be dissolved in water. Specifically, the lithium source may include $Li_2CO_3$, $LiNO_3$, $LiNO_2$, LiOH, $LiOH \cdot H_2O$, LiH, LiF, LiCl, LiBr, LiI, $CH_3COOLi$, $Li_2O$, $Li_2SO_4$, $CH_3COOLi$, or $Li_3C_6H_5O_7$, and any one thereof or a mixture of two or more thereof may be used.

The lithium raw material may be mixed such that a molar ratio (Li/M) of lithium (Li) of the lithium raw material to total metallic elements (M) of the precursor is 1.06 or less. The lithium raw material may be mixed such that the Li/M is more preferably in a range of 1 to 1.05, for example, 1 to 1.04. Since the Li/M satisfies the above range, a lithium composite transition metal oxide having a layered crystal structure of space group R3m and composed of a single particle may be formed.

Since the precursor, in which the amount of the nickel (Ni) in the total amount of the transition metals is 60 mol % or less and the cobalt (Co) is included in an amount greater than the amount of the manganese (Mn), is mixed with the lithium raw material and the mixture is sintered at a temperature of 980° C. or more, a single particle of an NCM-based positive electrode active material may be easily prepared by only single sintering. In a case in which a precursor including the cobalt (Co) in an amount less than the amount of the manganese (Mn) is used, it may be difficult to prepare the single particle of the NCM-based positive electrode active material even if the same sintering temperature and sintering time are used.

The sintering temperature may be in a range of 980° C. or more, preferably 980° C. to 1,050° C., and more preferably 980° C. to 1,020° C. to form the single particle. In a case in which the sintering temperature is less than 980° C., it may be difficult to prepare the single particle of the NCM-based positive electrode active material, and an NCM-based positive electrode active material in the form of an aggregated secondary particle may be prepared.

The sintering may be performed in an air or oxygen atmosphere, and may be performed for 5 hours to 13 hours.

The sintering may be performed such that the primary particle of the prepared single particle of the NCM-based positive electrode active material has an average particle diameter ($D_{50}$) of 2 μm to 10 μm. The sintering may more preferably be performed such that the primary particle has an average particle diameter ($D_{50}$) of 3 μm to 9 μm, for example, 4 μm to 8 μm.

Also, the sintering may be performed such that a crystallite size of the prepared single particle of the positive electrode active material is 210 nm or more. The sintering may be performed such that the crystallite size of the prepared single particle of the positive electrode active material may more preferably be 213 nm or more, for example, 215 nm or more.

Next, a coating portion may be formed by selectively mixing the lithium composite transition metal oxide with a coating raw material including at least one selected from the group consisting of Al, B, Zr, Ti, Mg, Ta, Nb, Mo, W, and Cr and performing a heat treatment. The coating raw material may preferably include Al, B, and/or W, and may more preferably include Al. In a case in which the coating raw material is Al, for example, $Al(OH)_3$, $Al_2O_3$, $AlPO_4$, $AlCl_3$, and $Al_2(SO_4)_3$ may be used.

The heat treatment may be performed in a temperature range of 300° C. to 700° C., and may more preferably be performed in a temperature range of 400° C. to 600° C. The heat treatment may be performed for 1 hour to 6 hours.

Since the coating portion is further formed, the lithium by-products on the surface of the particle may be further reduced and the amount of the gas generated during cell operation may be further reduced.

<Positive Electrode and Secondary Battery>

According to another embodiment of the present invention, provided are a positive electrode for a secondary battery and a lithium secondary battery which include the above positive electrode active material.

Specifically, the positive electrode includes a positive electrode collector and a positive electrode active material layer which is disposed on the positive electrode collector and includes the positive electrode active material.

In the positive electrode, the positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

Also, the positive electrode active material layer may include a conductive agent and a binder in addition to the above-described positive electrode active material.

In this case, the conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen-Black™, channel black, furnace black, lamp black, thermal black, and carbon fibers; powder or fibers of metal such as copper, nickel, aluminum, and silver, conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 1 wt % to 30 wt % based on a total weight of the positive electrode active material layer.

Furthermore, the binder improves the adhesion between the positive electrode active material particles and the adhesion between the positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one thereof or a mixture of two or more thereof may be used. The binder may be included in an amount of 1 wt % to 30 wt % based on the total weight of the positive electrode active material layer.

The positive electrode may be prepared according to a typical method of preparing a positive electrode except that the above-described positive electrode active material is used. Specifically, a composition for forming a positive electrode active material layer, which includes the above-described positive electrode active material as well as selectively the binder and the conductive agent, is coated on the positive electrode collector, and the positive electrode may then be prepared by drying and rolling the coated positive electrode collector. In this case, types and amounts of the positive electrode active material, the binder, and the conductive are the same as those previously described.

The solvent may be a solvent normally used in the art. The solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode active material, the conductive agent, and the binder in consideration of a coating thickness of a slurry and manufacturing yield, and may allow to have a viscosity that may provide excellent thickness uniformity during the subsequent coating for the preparation of the positive electrode.

Also, as another method, the positive electrode may be prepared by casting the composition for forming a positive electrode active material layer on a separate support and then laminating a film separated from the support on the positive electrode collector.

According to another embodiment of the present invention, an electrochemical device including the positive electrode is provided. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein the positive electrode is as described above. Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 µm to 500 µm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material. The negative electrode active material layer may be prepared by coating a composition for forming a negative electrode in the form of a slurry, which includes selectively the binder and the conductive agent as well as the negative electrode active material, on the negative electrode collector and drying the coated negative electrode collector, or may be prepared by casting the composition for forming a negative electrode on a separate support and then laminating a film separated from the support on the negative electrode collector.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_\beta$ (0<β<2), $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

Also, the binder and the conductive agent may be the same as those previously described in the positive electrode.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, LiCF$_3$SO$_3$, LiC$_4$F$_9$SO$_3$, LiN(C$_2$F$_5$SO$_3$)$_2$, LiN(C$_2$F$_5$SO$_2$)$_2$, LiN(CF$_3$SO$_2$)$_2$, LiCl, LiI, or LiB(C$_2$O$_4$)$_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the positive electrode active material according to the present invention stably exhibits excellent discharge capacity, output characteristics, and capacity retention, the lithium secondary battery is suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

Example 1

In a 40 L batch-type reactor set at 50° C., NiSO$_4$, CoSO$_4$, and MnSO$_4$ were mixed in water in amounts such that a molar ratio of nickel:cobalt:manganese was 50:30:20 to prepare a precursor-forming solution with a concentration of 2.4 M.

13 L of deionized water was put in a co-precipitation reactor (capacity 40 L), the reactor was then purged with nitrogen gas at a rate of 25 L/min to remove dissolved oxygen in the water and create a non-oxidizing atmosphere in the reactor. Thereafter, 83 g of a 25% NaOH aqueous solution was added, and stirring was then performed at a speed of 700 rpm and a temperature of 50° C. to maintain a pH at 11.5.

Subsequently, a co-precipitation reaction was performed for 48 hours while adding the precursor-forming solution at a rate of 1.9 L/hr together with a NaOH aqueous solution and a NH$_4$OH aqueous solution to form particles of a nickel-cobalt-manganese-containing hydroxide (Ni$_{0.5}$Co$_{0.3}$Mn$_{0.2}$(OH)$_2$). The hydroxide particles were separated, washed, and then dried in an oven at 120° C. to prepare a positive electrode active material precursor.

The positive electrode active material precursor thus prepared and a lithium source, LiOH, were added to a Henschel mixer (20 L) such that a molar ratio of Li/M(Ni, Co,Mn) was 1.02, and were mixed at a center speed of 300 rpm for 20 minutes. The mixed powder was put in an alumina crucible with a size of 330 mm×330 mm and sintered at 990° C. for 21 hours in an air atmosphere to form a lithium composite transition metal oxide positive electrode active material.

Example 2

A lithium composite transition metal oxide prepared as in Example 1 and Al$_2$O$_3$ were mixed. The mixed mixture was heat-treated at 500° C. for 3 hours in an air atmosphere to prepare a positive electrode active material having an Al coating portion formed thereon.

Example 3

A positive electrode active material was prepared in the same manner as in Example 1 except that a Ni$_{0.5}$Co$_{0.4}$Mn$_{0.1}$(OH)$_2$ precursor was used instead of the Ni$_{0.5}$Co$_{0.3}$Mn$_{0.2}$(OH)$_2$ precursor of Example 1.

Example 4

A positive electrode active material was prepared in the same manner as in Example 1 except that a Ni$_{0.45}$Co$_{0.35}$Mn$_{0.2}$(OH)$_2$ precursor was used instead of the Ni$_{0.5}$Co$_{0.3}$Mn$_{0.2}$(OH)$_2$ precursor of Example 1.

Comparative Example 1

A positive electrode active material was prepared in the same manner as in Example 1 except that the sintering temperature was set at 930° C. instead of 990° C.

Comparative Example 2

A positive electrode active material was prepared in the same manner as in Example 1 except that a Ni$_{0.5}$Co$_{0.2}$Mn$_{0.3}$(OH)$_2$ precursor was used instead of the Ni$_{0.5}$Co$_{0.3}$Mn$_{0.2}$(OH)$_2$ precursor of Example 1.

Experimental Example 1: Positive Electrode Active Material Observation

Figure 2:
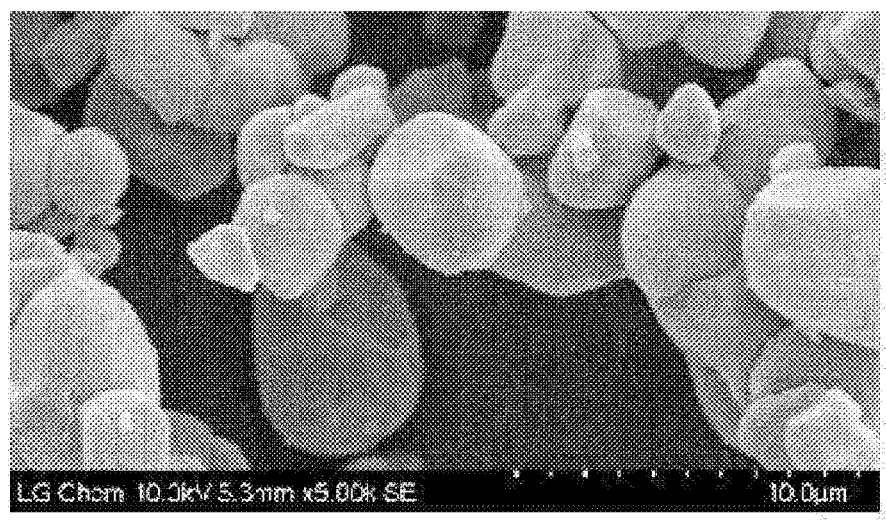
Figure 3:
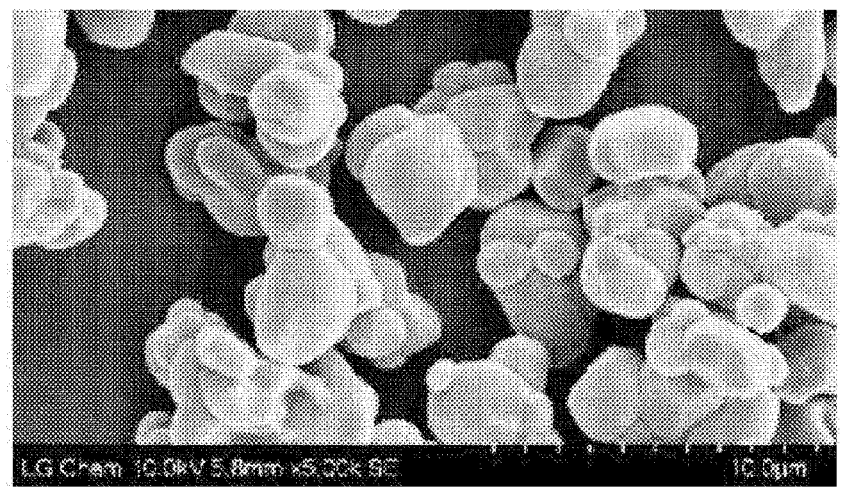
Figure 4:
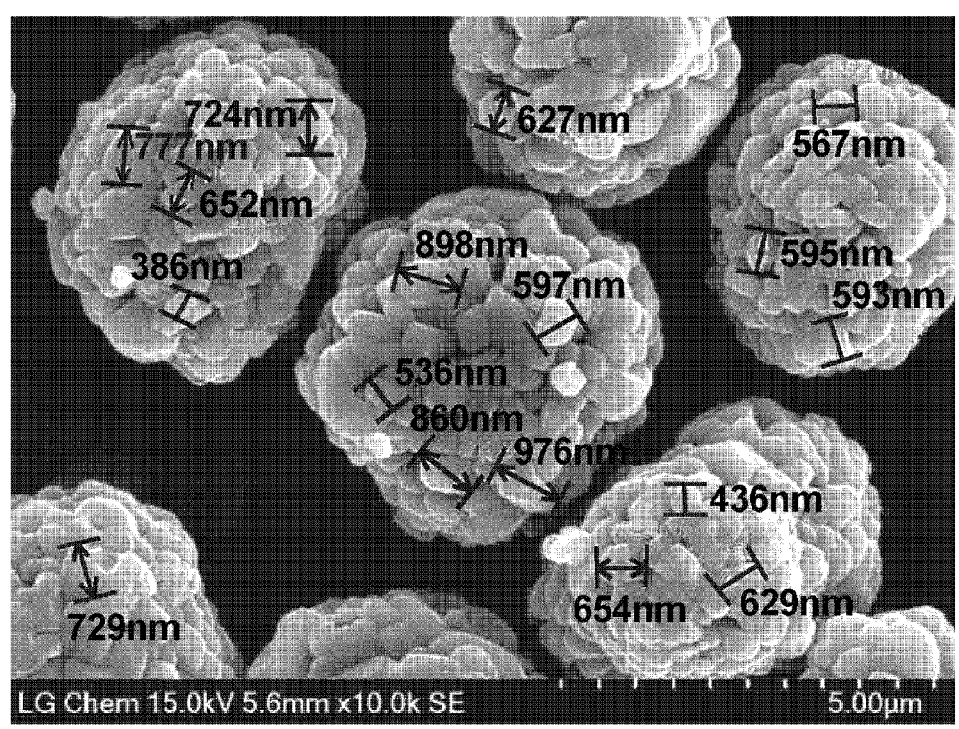
Figure 5:
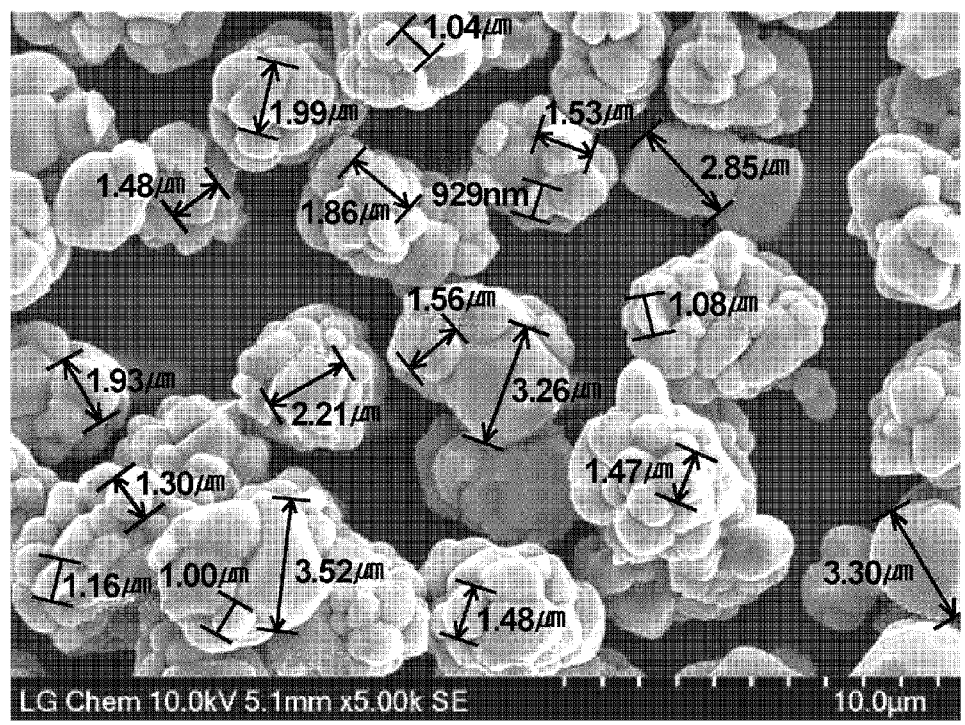

Magnified scanning electron microscope (SEM) images of the positive electrode active materials prepared in Examples 1, 3, and 4 and Comparative Examples 1 and 2 are illustrated in FIG. 1 (Example 1), FIG. 2 (Example 3), FIG. 3 (Example 4), FIG. 4 (Comparative Example 1), and FIG. 5 (Comparative Example 2).

Referring to FIGS. 1 to 5, the positive electrode active materials prepared in Examples 1, 3, and 4 of the present invention were in the form of a single particle, but it may be confirmed that Comparative Example 1, in which the sintering temperature was less than 980° C., or Comparative Example 2, in which the Ni$_{0.5}$Co$_{0.2}$Mn$_{0.3}$(OH)$_2$ precursor was used and the sintering was performed under the same conditions as in Example 1, was in the form of an aggregated secondary particle.

Experimental Example 2: Particle Breakage Observation

Each of the positive electrode active material powders prepared in Example 1 and Comparative Example 1 were pressed at 3.5 tons. Thereafter, the pressed positive electrode active materials were observed through a scanning electron microscope (SEM). The results thereof are presented in FIG. 6 (Example 1) and FIG. 7 (Comparative Example 1).

Figure 6:
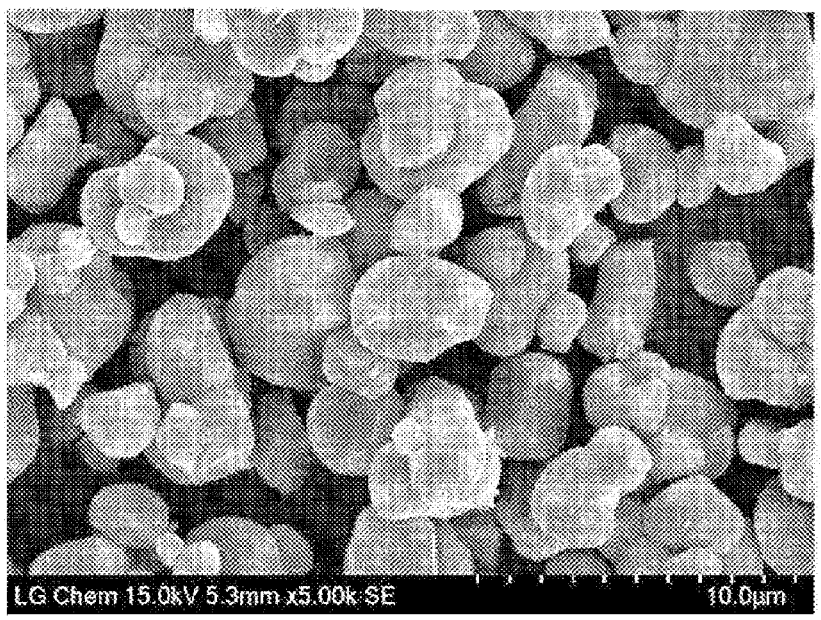
FIGS. 6 and 7 are magnified SEM images of the positive electrode active materials prepared in Example 1 and Comparative Example 1 before and after pressurization.
Figure 7:
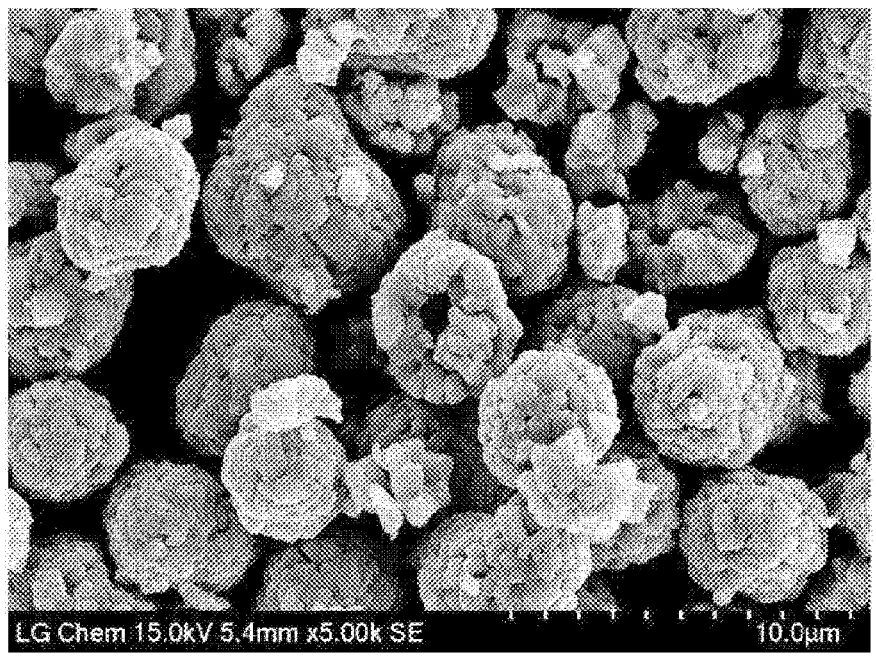

Referring to FIGS. 6 and 7, with respect to the positive electrode active material in the form of a single particle which was prepared in Example 1, it may be confirmed that a degree of particle breakage after rolling was significantly lower than that of the positive electrode active material in the form of an aggregated secondary particle which was prepared in Comparative Example 1. Accordingly, it may be understood that particle strength of the positive electrode active material in the form of a single particle, which was prepared in Example 1, was improved.

Experimental Example 3: XRD Measurement

Figure 8:
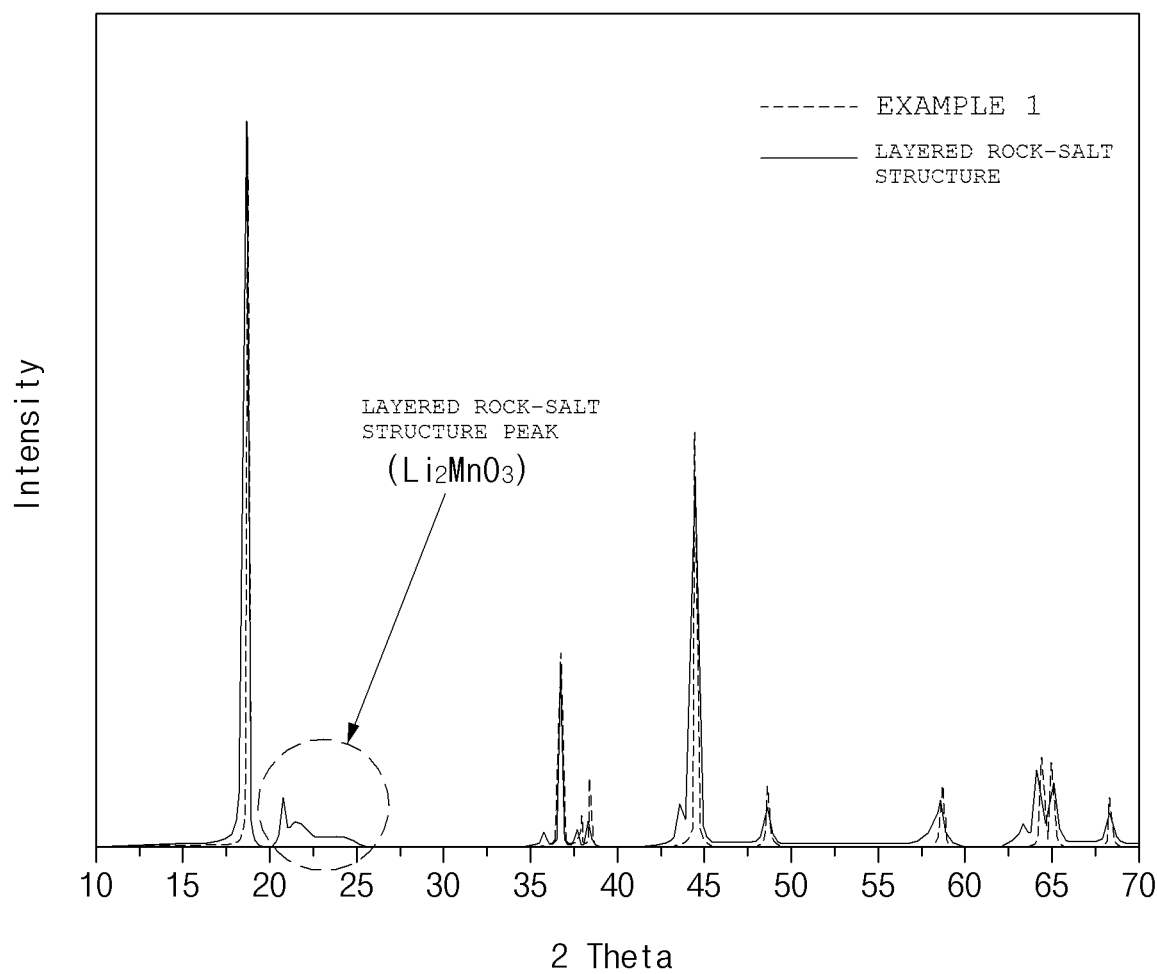
FIG. 8 illustrates X-ray diffraction (XRD) peaks of the positive electrode active material prepared in Example 1 and a positive electrode active material with a layered rock-salt structure.

XRD measurement was performed using the positive electrode active material prepared in Example 1, and the results thereof are presented in FIG. 8. In order to be compared with a layered rock-salt structure, results of XRD measurement performed using a positive electrode active material having a layered rock-salt structure are also presented in FIG. 8.

Referring to FIG. 8, with respect to the positive electrode active material prepared in Example 1, a peak did not appear in a 2Θ range of 20° to 25°, that is, it may be confirmed that it did not have a layered rock-salt structure.

Experimental Example 4: Specific Surface Area, Primary Particle Diameter, and Crystallite Size of Positive Electrode Active Material Specific surface areas, primary particle diameters, and crystallite sizes of the positive electrode active materials prepared in Examples 1, 3, and 4 and Comparative Examples 1 and 2 were measured. The specific surface areas were measured using a gas adsorption analyzer (BELSORP mini II), the primary particle diameters of Examples 1, 3, and 4 were measured using a laser diffraction method (Microtrac), the primary particle diameters of Comparative Examples 1 and 2 were measured using SEM images, and the crystallite sizes were measured by XRD (Ultima IV) and their values were calculated.

TABLE 1

|  | The presence of single particle | Primary particle (μm) | Specific surface area (m²/g) | Crystallite size (nm) |
|---|---|---|---|---|
| Example 1 | ○ | $D_{50}$ 4.8 | 0.38 | 220 |
| Example 3 | ○ | $D_{50}$ 8.0 | 0.32 | 218 |
| Example 4 | ○ | $D_{50}$ 4.3 | 0.43 | 226 |
| Comparative Example 1 | x | 0.4 to 0.9 | 0.55 | 158 |
| Comparative Example 2 | x | 1 to 2 | 0.51 | 202 |

Referring to Table 1, the positive electrode active materials prepared in Examples 1, 3, and 4 were in the form of a single particle, but the positive electrode active materials prepared in Comparative Examples 1 and 2 were not in the form of a single particle, but in the form of an aggregated secondary particle. The specific surface areas of the positive electrode active materials of Examples 1, 3, and 4 were 0.50 m²/g or less, wherein the specific surface areas were reduced in comparison to those of the positive electrode active materials of Comparative Examples 1 and 2. Also, the crystallite sizes of the positive electrode active materials of Examples 1, 3, and 4 were 210 nm or more, wherein the crystallite sizes were greater than those of the positive electrode active materials of Comparative Examples 1 and 2.

Experimental Example 5: Rolling Density and PSI

Rolling densities and PSIs of the positive electrode active materials prepared in Examples 1 to 4 and Comparative Examples 1 and 2 were obtained.

Specifically, the rolling densities were measured using Carver_4350. After 3 g of each of the positive electrode active materials of Examples 1 to 4 and Comparative Examples 1 and 2 was put into a cylindrical mold, the mold containing each positive electrode active material was pressed at a pressure of 2.5 tons. Thereafter, a height of the pressed mold was measured with a Vernier caliper and the rolling density was obtained.

The PSI was a value calculated by the following Equation 1.

$$\text{PSI(Particle Size Index)} = D_{50,\ 1.5\ ton}(\mu m) \times D_{50,\ 3.0\ ton}(\mu m) \times \text{rolling density}_{3.0\ ton}(g/cc)$$

With respect to the $D_{50,\ 1.5\ ton}$, after 3 g of each of the positive electrode active materials of Examples 1 to 4 and Comparative Examples 1 and 2 was put into a cylindrical mold and the mold containing each positive electrode active material was pressed at a pressure of 1.5 tons, the positive electrode active material was recovered from the pressed mold to measure the average particle diameter ($D_{50}$).

With respect to the $D_{50,\ 3.0\ ton}$, after 3 g of each of the positive electrode active materials of Examples 1 to 4 and Comparative Examples 1 and 2 was put into a cylindrical mold and the mold containing each positive electrode active material was pressed at a pressure of 3.0 tons, the positive electrode active material was recovered from the pressed mold to measure the average particle diameter ($D_{50}$).

With respect to the rolling density$_{3.0\ ton}$(g/cc), after 3 g of each of the positive electrode active materials of Examples 1 to 4 and Comparative Examples 1 and 2 was put into a cylindrical mold, the mold containing each positive electrode active material was pressed at a pressure of 3.0 tons. Thereafter, a height of the pressed mold was measured with a Vernier caliper and the rolling density was obtained.

The rolling densities and PSI values thus obtained are presented in Table 2 below.

TABLE 2

|  | Rolling density (g/cc) (@2.5 ton) | PSI |
|---|---|---|
| Example 1 | 3.05 | 81 |
| Example 2 | 3.01 | 81 |
| Example 3 | 3.25 | 257 |
| Example 4 | 2.95 | 64 |
| Comparative Example 1 | 2.75 | 42 |
| Comparative Example 2 | 2.85 | 54 |

Referring to Table 2, the positive electrode active materials prepared in Examples 1 to 4 had a rolling density of 2.9 g/cc or more, wherein the rolling densities were greater than those of the positive electrode active materials of Comparative Examples 1 and 2. Also, the positive electrode active materials of Examples 1 to 4 had a PSI of 60 or more, wherein the PSIs were greater than those of the positive electrode active materials of Comparative Examples 1 and 2. Since the PSIs satisfied 60 or more, it may be confirmed that the positive electrode active materials of Examples 1 to 4 were formed in the form of a single particle.

Experimental Example 6: Lithium by-Products Measurement

After 5 g of each of the positive electrode active materials prepared in Examples 1 to 4 and Comparative Examples 1 and 2 was dispersed in 100 mL of water, a change in pH was measured while the solution was titrated with 0.1 M HCl to obtain a pH titration curve. A residual amount of LiOH and a residual amount of $Li_2CO_3$ in each positive electrode active material were calculated by using the pH titration curve, and a sum of these values was evaluated as a total residual amount of lithium by-products and is listed in Table 3 below.

TABLE 3

|  | Lithium by-products residual amount (wt %) |
|---|---|
| Example 1 | 0.091 |
| Example 2 | 0.065 |
| Example 3 | 0.134 |
| Example 4 | 0.075 |
| Comparative Example 1 | 0.171 |
| Comparative Example 2 | 0.091 |

Referring to Table 3, the positive electrode active materials prepared in Examples 1 to 4 had an amount of lithium by-products of 0.15 wt % or less, wherein the amounts of the lithium by-products were reduced in comparison to that of the positive electrode active material of Comparative Example 1.

Experimental Example 7: Life Characteristics Evaluation

Each of the positive electrode active materials prepared in Examples 1 to 4 and Comparative Examples 1 and 2, a carbon black conductive agent, and a PVdF binder were mixed in an N-methylpyrrolidone solvent at a weight ratio of 96:2:2 to prepare a positive electrode material mixture, and one surface of an aluminum current collector was coated with the positive electrode material mixture, dried at 100° C., and then rolled to prepare a positive electrode.

Lithium metal was used as a negative electrode.

Each lithium secondary battery was prepared by preparing an electrode assembly by disposing a porous polyethylene separator between the positive electrode and negative electrode prepared as described above, disposing the electrode assembly in a case, and then injecting an electrolyte solution into the case. In this case, the electrolyte solution was prepared by dissolving 1.0 M lithium hexafluorophosphate ($LiPF_6$) in an organic solvent composed of ethylene carbonate/ethylmethyl carbonate/diethyl carbonate (mixing volume ratio of EC/EMC/DEC=3/4/3).

Each lithium secondary battery half cell prepared as described above was charged at 0.2 C to a voltage of 4.4 V in a constant current/constant voltage (CCCV) mode at 25° C. (termination current of 1/20 C), and discharged at a constant current of 0.2 C to a voltage of 3.0 V to measure initial charge and initial discharge capacities. Thereafter, each half cell was charged at 0.7 C to a voltage of 4.4 V in a CCCV mode, and discharged at a constant current of 0.5 C to a voltage of 3.0 V to measure capacity retention when 30 cycles of charge and discharge were performed and thus, life characteristics were evaluated. The results thereof are presented in Table 4 and FIG. 9.

TABLE 4

|  | Initial discharge capacity (mAh/g) | Capacity retention (%) (@ $30^{th}$ cycle) |
|---|---|---|
| Example 1 | 173.0 | 98.2 |
| Example 2 | 174.3 | 99.2 |
| Example 3 | 175.4 | 98.0 |
| Example 4 | 173.7 | 98.3 |
| Comparative Example 1 | 183.1 | 96.3 |
| Comparative Example 2 | 176.5 | 97.8 |

Figure 9:
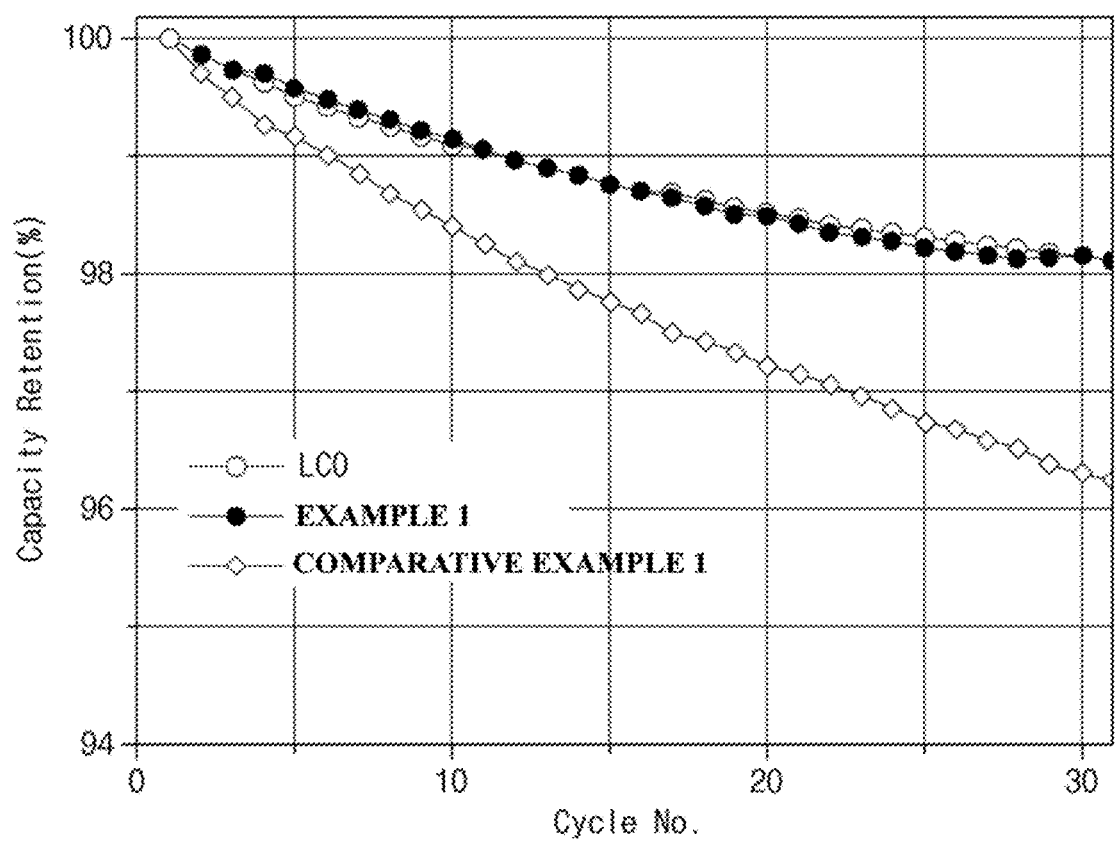
FIG. 9 is a graph illustrating life characteristics of Example 1, Comparative Example 1, and LCO.

Referring to Table 4 and FIG. 9, with respect to the positive electrode active materials prepared in Examples 1 to 4, initial capacities were equivalent or somewhat inferior to those of Comparative Examples 1 and 2, but it may be confirmed that life characteristics were significantly improved.

Experimental Example 8: High-Temperature Storage Characteristics Evaluation

Each of the lithium secondary battery half cells prepared as in Experimental Example 7 by using each of the positive electrode active materials prepared in Example 1 and Comparative Example 1 was charged at 0.5 C to a voltage of 4.4 V in a CCCV mode (termination current of 1/20 C). Two positive electrodes thus charged and two polyethylene separators were alternatively stacked on a coin cell bottom plate. Thereafter, after injecting an electrolyte solution, the stacked electrode plates were fixed by being covered with a gasket. The coin cell bottom plate having the electrode plates stacked thereon was put in an aluminum pouch and vacuum-sealed. Thereafter, gas generated during storage at 60° C. for 2 weeks was measured using a gas chromatograph-mass spectrometer (GC-MS). The results thereof are presented in Table 5 and FIG. 10 below.

TABLE 5

|  | Amount of gas generated during high-temperature storage (μl/g) |
|---|---|
| Example 1 | 1,350 |
| Comparative Example 1 | 2,400 |

Figure 10:
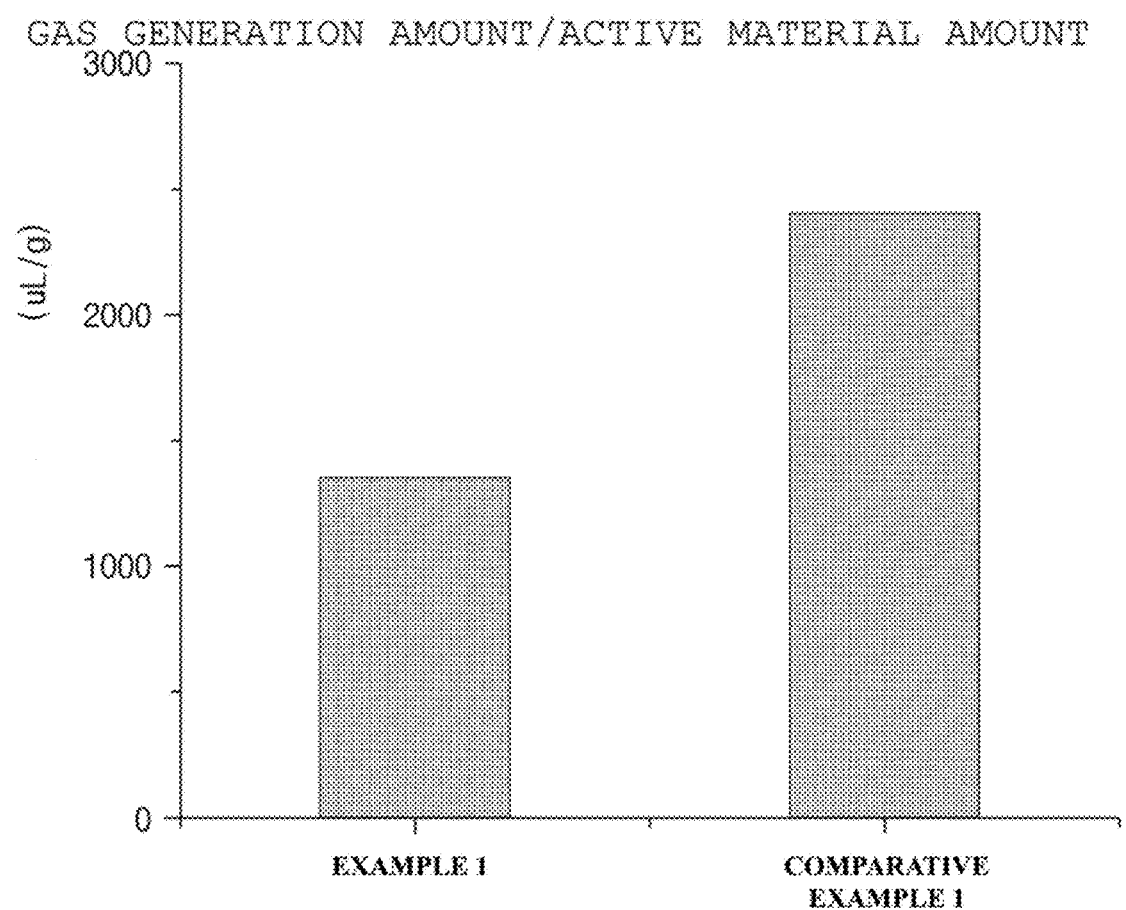
FIG. 10 is a graph illustrating amounts of gas generated during high-temperature storage of Example 1 and Comparative Example 1.

Referring to Table 5 and FIG. 10, with respect to the positive electrode active material prepared in Example 1, an amount of gas generated during high-temperature storage was significantly reduced in comparison to that of the positive electrode active material prepared in Comparative Example 1. The amount of gas generated of Comparative Example 1 in the form of an aggregated secondary particle was about 78% greater than that of the single particle of Example 1.

The invention claimed is:

1. A positive electrode active material for a secondary battery, comprising:
   a lithium composite transition metal oxide including nickel (Ni), cobalt (Co), and manganese (Mn),
   wherein the lithium composite transition metal oxide has a layered crystal structure of space group R3m,
   the lithium composite transition metal oxide comprises the nickel (Ni) in an amount of 60 mol % or less based on a total amount of transition metals, and the cobalt (Co) in an amount greater than an amount of the manganese (Mn), and
   the lithium composite transition metal oxide is composed of single particles,
   wherein the single particles are not in the form of an aggregated secondary particle,
   wherein the positive electrode active material has a crystallite size of 210 nm or more.

2. The positive electrode active material for a secondary battery of claim 1, wherein the single particles are in the form of primary particles having an average particle diameter ($D_{50}$) of 2 μm to 10 μm.

3. The positive electrode active material for a secondary battery of claim 1, wherein a peak corresponding to a layered rock-salt structure does not appear in a 2Θ range of 20° to 25° during XRD measurement of the positive electrode active material.

4. The positive electrode active material for a secondary battery of claim 1, wherein the lithium composite transition metal oxide has a molar ratio (Li/M) of lithium (Li) to total metallic elements (M) of 1.06 or less.

5. The positive electrode active material of claim 1, wherein a molar ratio (Li/M) is in a range of 1 to 1.06.

6. The positive electrode active material for a secondary battery of claim 1, wherein the positive electrode active material has a specific surface area of 0.50 m$^2$/g or less.

7. The positive electrode active material of claim 6, wherein the specific surface area is 0.5 m$^2$/g to 0.2 m$^2$/g.

8. The positive electrode active material for a secondary battery of claim 1, wherein an amount of residual lithium by-products in the positive electrode active material is 0.2 wt % or less based on a total weight of the positive electrode active material.

9. The positive electrode active material for a secondary battery of claim 1, wherein the positive electrode active material has a rolling density during pressurization at 2.5 tons of 2.9 g/cc or more.

10. The positive electrode active material for a secondary battery of claim 1, wherein a coating portion including at least one selected from the group consisting of aluminum (Al), boron (B), zirconium (Zr), titanium (Ti), magnesium (Mg), tantalum (Ta), niobium (Nb), molybdenum (Mo), tungsten (W), and chromium (Cr) is formed on a surface of the particle of the positive electrode active material.

11. The positive electrode active material for a secondary battery of claim 1, wherein the positive electrode active material has a particle size index (PSI) represented by Equation 1 of 60 or more:

$$\text{PSI} = D_{50,\ 1.5\ ton}(\mu m) \times D_{50,\ 3.0\ ton}(\mu m) \times \text{rolling density}_{3.0\ ton}(g/cc) \quad \text{[Equation 1]}$$

wherein, in Equation 1, $D_{50,\ 1.5\ ton}$ is an average particle diameter ($D_{50}$) of the positive electrode active material after pressurization at 1.5 tons, $D_{50,\ 3.0\ ton}$ is an average particle diameter ($D_{50}$) of the positive electrode active material after pressurization at 3.0 tons, and rolling density$_{3.0\ ton}$ is rolling density during pressurization at 3.0 tons.

12. A positive electrode for a secondary battery, the positive electrode comprising the positive electrode active material of claim 1.

13. A lithium secondary battery comprising the positive electrode of claim 12.

14. A method of preparing the positive electrode active material of claim 1, the method comprising:
   preparing a precursor including nickel (Ni), cobalt (Co), and manganese (Mn) in which an amount of the nickel (Ni) in a total amount of transition metals is 60 mol % or less and the cobalt (Co) is included in an amount greater than an amount of the manganese (Mn); and
   mixing the precursor with a lithium raw material and sintering the mixture at a temperature of 980° C. or more to form a lithium composite transition metal oxide having a layered crystal structure of space group R3m and composed of single particles.

15. The method of claim 14, wherein the sintering temperature is in a range of 980° C. to 1,050° C.

16. The method of claim 14,
   wherein the sintering is performed such that the single particles are in the form of primary particles having an average particle diameter ($D_{50}$) of 2 μm to 10 μm.

17. The method of claim 14,
   wherein the sintering is performed such that the positive electrode active material has the crystallite size of 210 nm or more.

18. The method of claim 14, wherein the lithium raw material is mixed such that a molar ratio (Li/M) of lithium (Li) of the lithium raw material to total metallic elements (M) of the lithium composite transition metal oxide is 1.06 or less.

19. The method of claim 14, further comprising mixing the lithium composite transition metal oxide with a coating raw material including at least one selected from the group consisting of Al, B, Zr, Ti, Mg, Ta, Nb, Mo, W, and Cr and performing a heat treatment to form a coating portion.

* * * * *